US008472874B2

(12) United States Patent
Tang et al.

(10) Patent No.: US 8,472,874 B2
(45) Date of Patent: Jun. 25, 2013

(54) METHOD AND SYSTEM FOR PAIRING OF WIRELESS DEVICES USING PHYSICAL PRESENCE

(75) Inventors: John Tang, San Carlos, CA (US); Evans Hankey, San Francisco, CA (US); Emery A. Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1015 days.

(21) Appl. No.: 11/686,253

(22) Filed: Mar. 14, 2007

(65) Prior Publication Data

US 2008/0227393 A1 Sep. 18, 2008

(51) Int. Cl.
*H04B 7/00* (2006.01)
(52) U.S. Cl.
USPC ...... 455/41.2; 455/575.2; 455/558; 340/5.53; 370/313
(58) Field of Classification Search
USPC ............. 455/41.2, 575.2, 558, 557, 445, 456, 455/3.06; 340/5.53, 5.52; 370/313, 310; 379/212.01
See application file for complete search history.

(56) References Cited

U.S. PATENT DOCUMENTS

| | | | | |
|---|---|---|---|---|
| 6,850,147 B2 * | 2/2005 | Prokoski et al. | | 340/5.53 |
| 7,146,191 B2 * | 12/2006 | Kerner et al. | | 455/558 |
| 7,174,130 B2 * | 2/2007 | Kurisko et al. | | 455/41.2 |
| 7,215,649 B2 * | 5/2007 | Yu et al. | | 370/313 |
| 7,254,367 B2 * | 8/2007 | Helden et al. | | 455/41.2 |
| 7,597,250 B2 * | 10/2009 | Finn | | 235/380 |
| 7,603,414 B2 * | 10/2009 | Rosenberg | | 709/204 |
| 8,045,961 B2 | 10/2011 | Ayed et al. | | |
| 2002/0140542 A1 * | 10/2002 | Prokoski et al. | | 340/5.52 |
| 2003/0013411 A1 * | 1/2003 | Uchiyama | | 455/40 |
| 2003/0050009 A1 * | 3/2003 | Kurisko et al. | | 455/41 |
| 2003/0124979 A1 * | 7/2003 | Tanada et al. | | 455/41 |
| 2005/0021725 A1 * | 1/2005 | Lobbert | | 709/223 |
| 2005/0044372 A1 | 2/2005 | Aull et al. | | |
| 2005/0152294 A1 * | 7/2005 | Yu et al. | | 370/310 |
| 2005/0159184 A1 * | 7/2005 | Kerner et al. | | 455/558 |
| 2005/0203912 A1 | 9/2005 | Beach et al. | | |
| 2005/0254639 A1 * | 11/2005 | Rodriguez et al. | | 379/388.04 |
| 2006/0003806 A1 * | 1/2006 | Weber et al. | | 455/561 |
| 2006/0068760 A1 * | 3/2006 | Hameed et al. | | 455/412.1 |

(Continued)

FOREIGN PATENT DOCUMENTS

| | | |
|---|---|---|
| EP | 1 596 538 A | 11/2005 |
| WO | WO 00/51293 A | 8/2000 |
| WO | WO 2006/071364 A | 7/2006 |

OTHER PUBLICATIONS

International Search Report and Written Opinion for PCT/US2008/056071, mailed Jul. 25, 2008.

(Continued)

*Primary Examiner* — Minh D Dao
(74) *Attorney, Agent, or Firm* — Meyertons, Hood, Kivlin, Kowert & Goetzel, P.C.

(57) ABSTRACT

Techniques that facilitate pairing of wireless devices with other wireless devices are disclosed. Once paired, the wireless devices can exchange data in a wireless manner. According to one embodiment, a pairing process can be secured through use of physical proximity, or even physical connection, of wireless devices to be paired. According to another embodiment, user actions to provoke or perform pairing can be reduced or eliminated. According to still another embodiment, a wireless device being paired can be configured using configuration information provided from another wireless device being paired.

44 Claims, 8 Drawing Sheets

U.S. PATENT DOCUMENTS

| | | | |
|---|---|---|---|
| 2006/0098238 A1* | 5/2006 | Ylonen | 358/402 |
| 2006/0194535 A1* | 8/2006 | Houldsworth et al. | 455/3.01 |
| 2006/0219776 A1* | 10/2006 | Finn | 235/380 |
| 2007/0013801 A1* | 1/2007 | Sezan et al. | 348/333.01 |
| 2007/0161349 A1* | 7/2007 | Grushkevich | 455/41.2 |
| 2007/0232358 A1* | 10/2007 | Sherman | 455/560 |
| 2007/0263003 A1* | 11/2007 | Ko et al. | 345/502 |
| 2007/0293197 A1* | 12/2007 | Ekberg et al. | 455/414.1 |
| 2007/0294556 A1* | 12/2007 | Wutka | 713/324 |
| 2008/0057868 A1* | 3/2008 | Chang | 455/41.2 |
| 2008/0076489 A1* | 3/2008 | Rosener et al. | 455/575.2 |
| 2008/0119241 A1* | 5/2008 | Dorogusker et al. | 455/573 |
| 2008/0129610 A1* | 6/2008 | Tsfati et al. | 343/702 |
| 2008/0148052 A1 | 6/2008 | Lindsley | |
| 2008/0162937 A1* | 7/2008 | Kohlenberg et al. | 713/171 |
| 2008/0166968 A1* | 7/2008 | Tang et al. | 455/41.2 |
| 2008/0167088 A1* | 7/2008 | Rabu et al. | 455/573 |
| 2008/0242229 A1* | 10/2008 | Sharma | 455/41.3 |
| 2008/0268776 A1* | 10/2008 | Amendola | 455/41.2 |
| 2008/0274770 A1* | 11/2008 | Park et al. | 455/557 |
| 2008/0287063 A1* | 11/2008 | Kidron et al. | 455/41.2 |
| 2008/0288845 A1* | 11/2008 | Tsfati et al. | 714/748 |
| 2009/0017755 A1* | 1/2009 | Tomoda | 455/41.2 |
| 2009/0060215 A1* | 3/2009 | Ocasio | 381/67 |
| 2009/0083847 A1 | 3/2009 | Fadell et al. | |
| 2009/0137206 A1* | 5/2009 | Sherman et al. | 455/41.2 |
| 2009/0150445 A1* | 6/2009 | Herberger et al. | 707/104.1 |
| 2009/0150553 A1* | 6/2009 | Collart et al. | 709/229 |
| 2009/0158039 A1* | 6/2009 | Prasad et al. | 713/168 |
| 2009/0197640 A1* | 8/2009 | Fa et al. | 455/556.1 |
| 2009/0221234 A1* | 9/2009 | Pirzada et al. | 455/41.2 |
| 2009/0239470 A1* | 9/2009 | Sherman | 455/41.2 |
| 2009/0249407 A1* | 10/2009 | Manne et al. | 725/68 |
| 2012/0021684 A1 | 1/2012 | Schultz et al. | |

OTHER PUBLICATIONS

Office Action for Australian Patent Application No. 2008226570, dated Jun. 17, 2010.
Communication Pursuant to Rules 94(3) for European Patent Application No. 08731560.2 dated Mar. 24, 2010.
Examiner's Report for Australian Patent Application No. 2008226570, dated Aug. 18, 2011.
Examiner's Report for Australian Patent Application No. 2008226570, dated Nov. 11, 2010.
Communication pursuant to Article 94(3) EPC for European Patent Application No. 08731560.2, dated Feb. 18, 2011.
First Office Action for Chinese Patent Application No. 200880008290.7, dated Sep. 15, 2011.
Harchandrai, Padmini; "Apps for Sharing Data via Bluetooth on Mobile Devices;" Tech 2, Mar. 18, 2011, retrieved from <http://tech2.in.com/features/apps/apps-for-sharing-data-via-bluetooth-on-mobile-devices/208002> on Jan. 11, 2013; pp. 1-4.
International Preliminary Report on Patentability for PCT/US2008/056071, mailed Sep. 24, 2009.

* cited by examiner

METHOD AND SYSTEM FOR PAIRING OF WIRELESS DEVICES USING PHYSICAL PRESENCE

CROSS-REFERENCE TO RELATED APPLICATIONS

This application is related to: (i) U.S. patent application Ser. No. 11/245,937, filed Oct. 7, 2005, and entitled "TECHNIQUES FOR PAIRING REMOTE CONTROLLERS WITH HOST DEVICES", which is hereby incorporated by reference herein; (ii) U.S. patent application Ser. No. 11/513,616, filed Aug. 30, 2006, and entitled "AUTOMATED PAIRING OF WIRELESS ACCESSORIES WITH HOST DEVICE", which is hereby incorporated by reference herein; and (iii) U.S. patent application Ser. No. 11/513,692, filed Aug. 30, 2006, and entitled "PAIRING OF WIRELESS DEVICES USING A WIRED MEDIUM", which is hereby incorporated by reference herein.

BACKGROUND OF THE INVENTION

1. Field of the Invention

The present invention relates to wireless devices and, more particularly, to pairing wireless devices for authorized data exchange.

2. Description of the Related Art

Traditionally, headphones or earphones are connected to an audio output device, such as a mobile phone or media player, through a wired connection. The wired connection can, however, in many cases be cumbersome or annoying to the user. Hence, in recent times, wireless headsets or earphones have been developed. Typically, these wireless devices utilize Bluetooth technology or other short range wireless technology in order to wirelessly transmit data between the headset or earphone and the mobile phone. As a result, there is no need for a wired connection between the headset or earphones and the mobile phone or media player.

Unfortunately, however, before the wireless headset or earphone can operate in a wireless manner with a mobile audio device (e.g., mobile phone, portable media player, etc.), the wireless headset or earphone must be paired with the mobile audio device. Pairing is a process that is used to associate a headset or earphone with a particular audio device, and vice versa. The pairing provides for secure data transfer between the devices, typically through use of encryption. Thus, the pairing helps ensure that the data being transferred is not only secured but also transferred to the appropriate recipient device. Pairing, however, requires that a pin code be entered in order to pair a mobile audio device with a headset or earphone. Entering of a pin code is sometimes problematic for a user. For example, often mobile audio devices are small handheld devices and the entering of a pin code can be cumbersome given the small scale of mobile audio devices. The mobile audio devices may also not offer a user interface that supports ease of entry of a pin code. Still further, users often do not know the appropriate pin code to be utilized.

Moreover, similar difficulties exist for other types of wireless devices besides headsets and earphones. For example, other wireless devices that also need to undergo pairing include remote controllers, computing devices, peripheral devices, etc.

Thus, there is a need for improved techniques to facilitate pairing of wireless devices.

SUMMARY OF THE INVENTION

The invention relates to pairing wireless devices so that they can exchange data in a wireless manner. One embodiment of the invention is that a pairing process can be secured through use of physical proximity, or even physical connection, of wireless devices to be paired. Another embodiment of the invention is that user actions to provoke or perform pairing can be reduced or eliminated. Still another embodiment of the invention is that a wireless device being paired can be configured using configuration information provided from another wireless device being paired.

The invention can be implemented in numerous ways, including as a method, system, device, apparatus, or computer readable medium. Several embodiments of the invention are discussed below.

As a method for pairing first and second electronic devices for wireless communication, one embodiment of the invention can, for example, include at least: detecting, at the first electronic device, that the second electronic device is in close proximity; initiating pairing of the first and second electronic devices after it is detected that the second electronic device is in close proximity to the first electronic device; completing pairing of the first and second electronic devices; and configuring the second electronic device based on configuration information stored by the first electronic device.

As a method for pairing first and second electronic devices for wireless communication, another embodiment of the invention can, for example, include at least: detecting a wired connection between the first and second electronic devices; initiating pairing of the first and second electronic devices after the wired connected has been detected; and completing pairing of the first and second electronic devices.

As a method for pairing first and second electronic devices for wireless communication, still another embodiment of the invention can, for example, include at least: detecting a user action with respect to at least one of the first electronic device and the second electronic device; initiating pairing of the first and second electronic devices in response to the detection of the user action; and completing pairing of the first and second electronic devices.

As a computer readable medium including computer program code for pairing first and second electronic devices for wireless communication, one embodiment of the invention can, for example, include at least: computer program code for detecting, at the first electronic device, that the second electronic device is in close proximity; and computer program code for pairing of the first and second electronic devices after or while it is detected that the second electronic device is in close proximity to the first electronic device.

As a host electronic device, one embodiment of the invention can, for example, include at least: proximity means for detecting a wireless device being in close proximity to the host electronic device; a wireless transceiver for transferring data between the host electronic device and the wireless device over a wireless data link; and a pairing manager operatively connected to the proximity means the wireless transceiver. The pairing manager can operate to manage pairing of the host electronic device and the wireless device. The pairing manager can require that the wireless device be in close proximity to the host electronic device in order to pair the host electronic device and the wireless device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to pairing wireless devices so that they can exchange data in a wireless manner. One embodiment of the invention is that a pairing process can be secured through use of physical proximity, or even physical connection, of wireless devices to be paired. Another embodiment of the invention is that user actions to provoke or perform pairing can be reduced or eliminated. Still another embodiment of the invention is that a wireless device being paired can be configured using configuration information provided from another wireless device being paired.

Wireless devices are electronic devices that support wireless data transfer. In one embodiment, of a pair of wireless devices being paired, one of the wireless devices can be a wireless host device. As an example, the wireless host device can be a computing device (e.g., personal computer, media device, etc.). The other of the wireless devices can be a peripheral device, an accessory or another computing device. As examples, a peripheral device can be a data storage device, an output device (e.g., printer), or an input device (e.g., mouse, keyboard). An accessory device can, for example, be a headset, earphones or remote controller. In one embodiment, a media device can be a mobile communication device (e.g., mobile phone), a media player (e.g., portable media player), a set-top box, a game player, a docking station for a portable media player, a multi-function media appliance, and/or a dedicated media appliance.

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
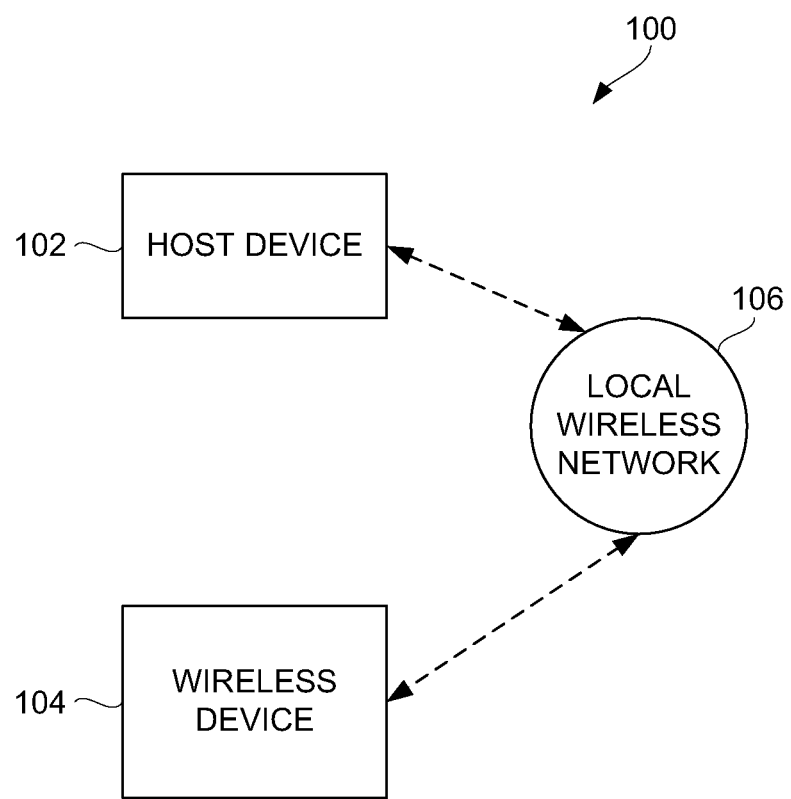
FIG. 1 is a block diagram of a wireless pairing system according to one embodiment of the invention.

FIG. 1 is a block diagram of wireless pairing system 100 according to one embodiment of the invention. Wireless pairing system 100 can include host device 102 and wireless device 104. Host device 102 is an electronic device, such as a personal computer or media device. Wireless device 104 is an electronic device that can be used in conjunction with host device 102. For example, wireless device 104 can be a peripheral device or an accessory device that augments the capabilities of host device 102. As a specific example, wireless device 104 could pertain to a wireless headset that is used in conjunction with host device 102 that provides media playback (e.g., audio and/or video playback) or voice communications. Wireless device 104 can also be any of the devices that host device 102 can be.

Local wireless network 106 can be used to wirelessly couple host device 102 and wireless device 104. So long as host device 102 and wireless device 104 are properly paired together, a wireless link can be established between host device 102 and wireless device 104 via local wireless network 106. Local wireless network 106 is often referred to as a piconet, which is a short range local wireless network. One example of local wireless network 106 is a Bluetooth network.

In addition, according to the invention, to facilitate pairing of host device 102 with wireless device 104, host device 102 and wireless device 104 are brought in close proximity to one another. As used herein, "close proximity" means within about one (1) meter of one another, which includes direct physical contact. The close proximity of the devices secures the pairing process from unauthorized intruders. In any case, once host device 102 and wireless device 104 are in close proximity, they can be paired together. Once paired, host device 102 and wireless device 104 are permitted to communicate by way of local wireless network 106.

According to one embodiment the invention, wireless device 104 is able to be paired with host device 102 without requiring user input of a pin code. In other words, instead of the user of wireless device 104 being required to enter a pin code, the user brings host device 102 and wireless device 104 in close proximity of one another. In one embodiment, a pin code can be delivered to wireless device 104 from host device 102 over a wireless link provided by the local wireless network, a direct connection if wireless device 104 and host device 102 are physically connected, or another wireless means while the devices are in close proximity. As such, the user does not have to remember and enter an appropriate pin code, thus the pairing can be performed in a substantially automated manner that reduces or eliminates cumbersome and tedious pairing actions that a user would otherwise have to perform. In another embodiment, there is no need for use of a pin code given that the close proximity of the devices provides a level of physical security.

Figure 2A:
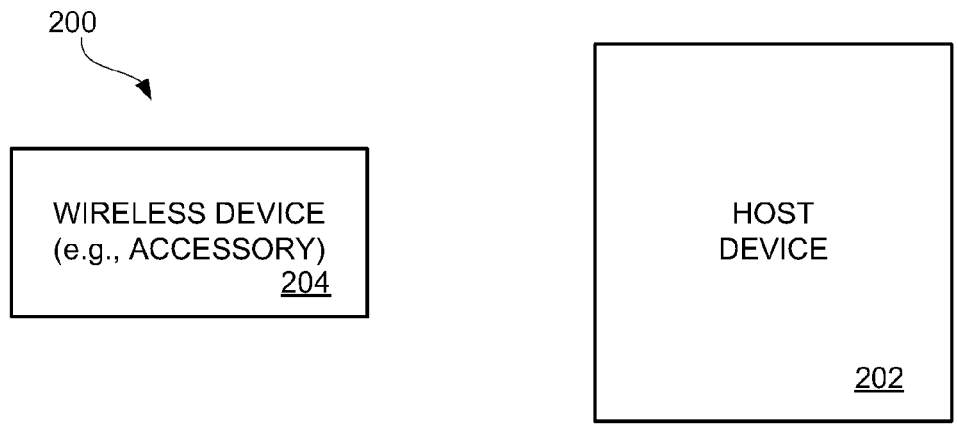
FIG. 2A is a block diagram of a wireless pairing system according to another embodiment of the invention.

FIG. 2A is a block diagram of wireless pairing system 200 according to one embodiment of the invention. Wireless pairing system 200 can include host device 202 and wireless device 204. Host device 202 is an electronic device, such as a personal computer, mobile communication device, media player (including portable media player), etc. Wireless device 204 is an electronic device that can be used in conjunction with host device 202. For example, wireless device 204 can pertain to an accessory device or peripheral device for use with host device 202. In FIG. 2A, wireless device 204 is shown as being apart from host device 202. At this point, it is assumed that a user desires to pair together wireless device 204 and host device 202. In one embodiment, the user acts to bring wireless device 204 into close proximity to host device 202, or bring host device 202 in close proximity to wireless device 204, or both.

Figure 2B:
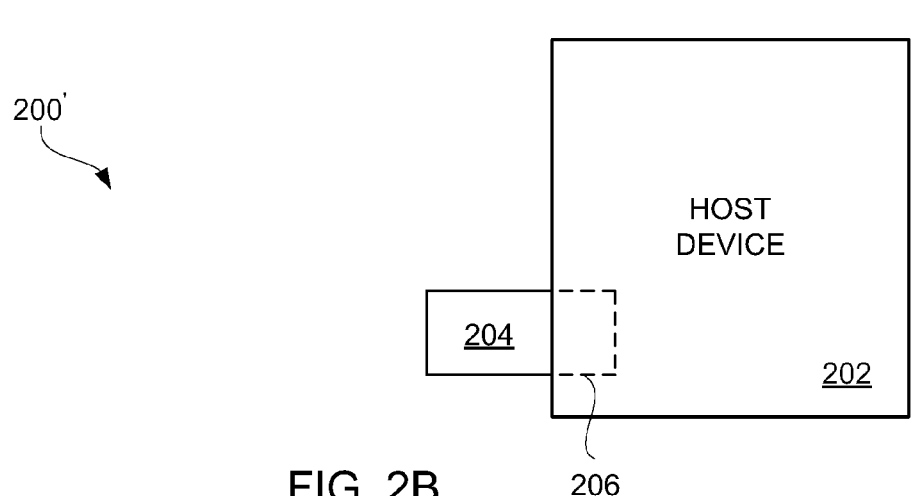
FIG. 2B is a block diagram of a wireless pairing system according to another embodiment of the invention.

FIG. 2B is a block diagram of wireless pairing system 200' according to one embodiment of the invention. Wireless pairing system 200' is generally similar to wireless pairing system 200 illustrated in FIG. 2A. However, in FIG. 2B, wireless device 204 has been physically connected to host device 202. The direct physical connection can be utilized to facilitate pairing of wireless device 204 with host device 202. Additionally, while physically connected, data can be exchanged between the devices. In one embodiment, host device 202 can include receptacle 206 that is capable of receiving wireless device 204, thereby providing a direct connection between wireless device 204 and host device 202.

Figure 2C:
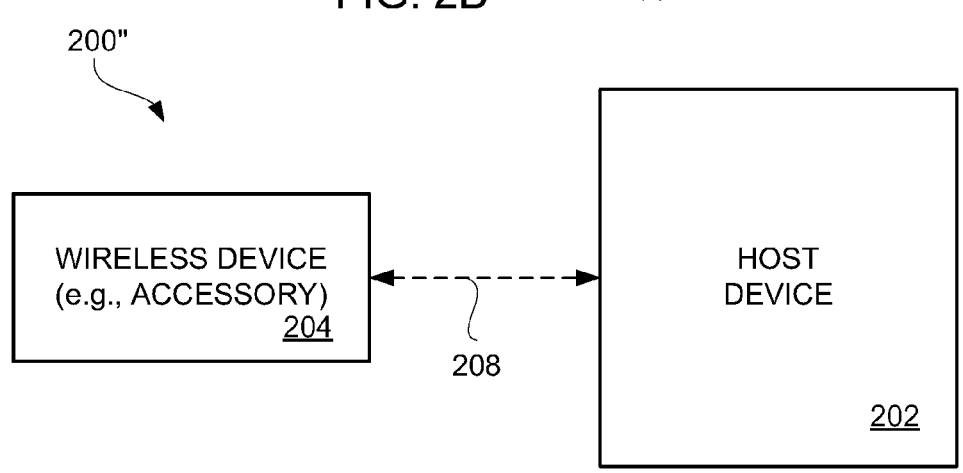
FIG. 2C is a block diagram of a wireless pairing system according to another embodiment of the invention.

FIG. 2C is a block diagram of wireless pairing system 200" according to one embodiment of the invention. Wireless pairing system 200" is generally similar to wireless pairing system 200 as illustrated in FIG. 2A. However, in FIG. 2C, wireless device 204 is brought within close proximity to host device 202. When wireless device 204 is within close proximity of host device 202, wireless data link 208 can be provided by a close range wireless data link between wireless device 204 and host device 202. In one embodiment, wireless data link 208 is limited within a confined distance between the devices. As an example, wireless data link 208 can require that wireless device 204 be within one (1) meter of host device 202. In another embodiment, wireless data link 208 could require that wireless device 204 be within about thirty (30) centimeters or one (1) foot of host device 202. The confined distance in which wireless data link 208 operates is able to facilitate pairing of wireless device 204 with host device 202 in a manner that is nearly as secure as the direction connection provided by wireless pairing system 200'.

Figure 2D:
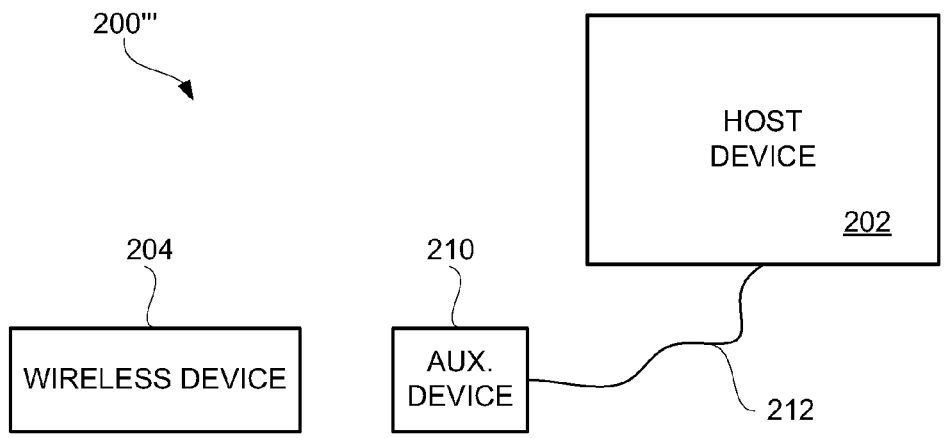
FIG. 2D is a wireless pairing system according to another embodiment of the invention.

FIG. 2D is wireless pairing system 200''' according to another embodiment of the invention. Wireless pairing system 200''' can include host device 202 and wireless device 204 as discussed above in FIG. 2A. However, wireless pairing system 200''' can further include auxiliary device 210 that is electrically connected to host device 202 by way of cable (or wire) 212. In one embodiment, auxiliary device 210 can pertain to a peripheral device for host device 202. One specific example for auxiliary device 210 is a docking station. Auxiliary device 210 can include a receptacle to receive wireless device 204 similar to receptacle 206 illustrated in FIG. 2B. Alternatively, auxiliary device 210 could permit a wireless data link to be established between wireless device 204 and auxiliary device 210 so long as such devices are in close proximity, which is similar to wireless data link 208 illustrated in FIG. 2C.

Auxiliary device 210 can also be referred to an intermediate device. In other words, auxiliary device 210 as shown in FIG. 2D is provided between wireless device 204 and host device 202. The intermediate device can pertain to a dock, adapter, media station, media player, personal computer, etc. In one example, an adapter can pertain to a cigarette lighter adapter that can be utilized in a cigarette lighter as typically provided in an automobile.

Figure 3:
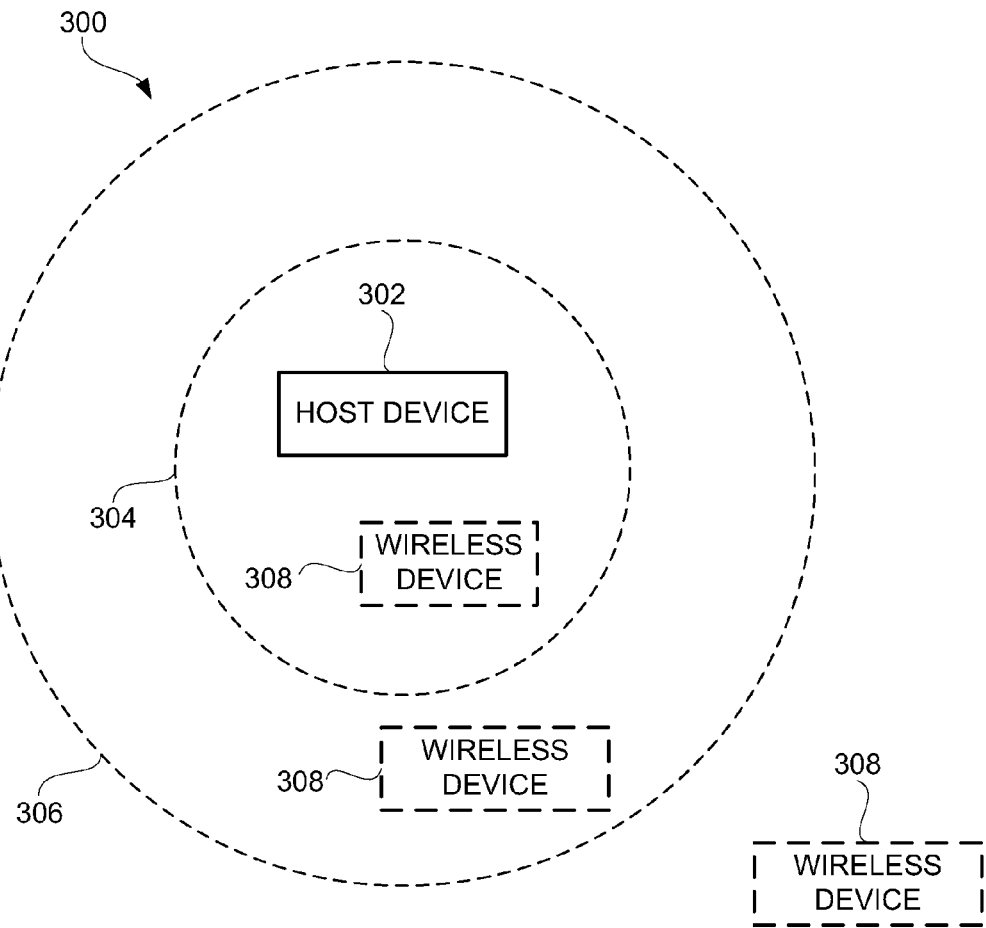
FIG. 3 is a diagram of a wireless pairing environment according to one embodiment of the invention.

FIG. 3 is a diagram of wireless pairing environment 300 according to one embodiment of the invention. Wireless pairing environment 300 is provided about host device 302. Wireless pairing environment 300 includes proximity zone 304 that is provided about host device 302. Proximity zone 304 is a region around host device 302 that corresponds to close proximity. In addition, wireless pairing environment 306 includes wireless zone 306. Wireless zone 306 is a region surrounding host device 302 in which wireless communication can be provided using a piconet or other short range wireless network, such as Bluetooth network. Hence, when a user of host device 302 desires to have wireless device 308 paired with host device 302 so that wireless data transfer can be provided between the devices, wireless device 308 is brought in close proximity to host device 302. Hence, as illustrated in FIG. 3, when wireless device 308 is within proximity zone 304, wireless device 308 is in close proximity to host device 302. In such case, host device 302 and wireless device 308 can be paired together so that wireless data transfer can be securely provided there between. After wireless device 308 has been paired with host device 302, wireless device 308 can participate in data transfer with host device 302 so long as wireless device 308 is within wireless zone 306. Although the range of wireless zone 306 is dependent on the nature of a local wireless network providing wireless zone 306, the range of wireless zone 306 is substantially larger that proximity zone 304. However, when wireless device 308 is not within wireless zone 306, wireless device 308 is unable to transfer data with host device 302.

In one embodiment, by bringing wireless device 308 within proximity zone 304, or even connecting wireless device 308 to host device 302, wireless device 308 and host device 302 can be paired for subsequent wireless data transfer. In one implementation, the pairing can be substantially automated such that a user may not need to perform any additional actions other than to present wireless device 308 within close proximity, i.e., within proximity zone 304 with respect to host device 302. Afterwards, wireless device 308 can transfer data with host device 302 so long as accessory device 308 remains within wireless zone 306. Wireless zone 306 can pertain to the piconet with respect to host device 302 and accessory device 308. The piconet can, for example, be established by a Bluetooth network or other short range local wireless network.

Figure 4:
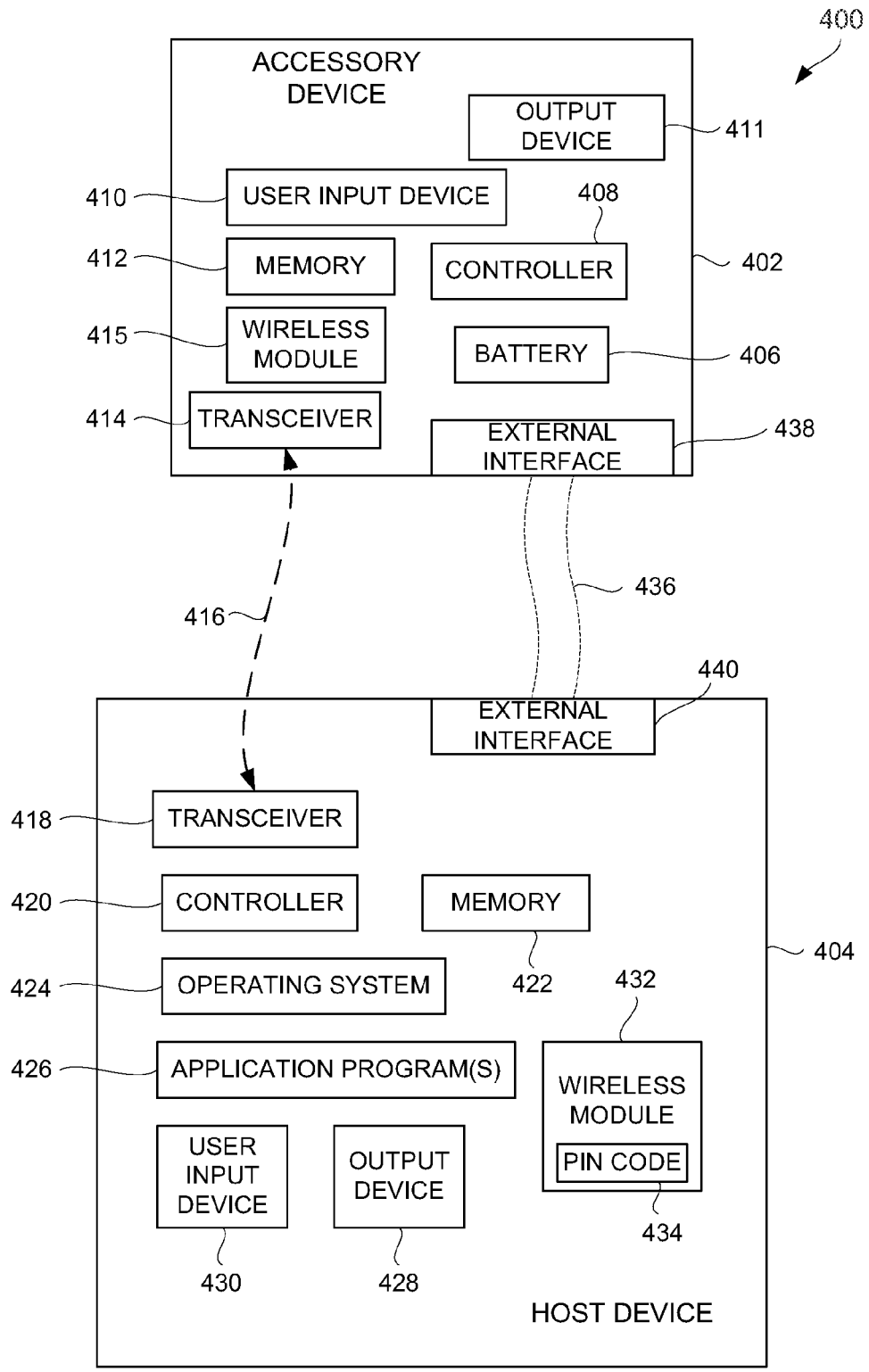
FIG. 4 is a diagram of a wireless system according to one embodiment of the invention.

FIG. 4 is a diagram of wireless system 400 according to one embodiment of the invention. Wireless system 400 can include accessory device 402 and host device 404. As an example, accessory device 402 can represent wireless device 104 illustrated in FIG. 1, and host device 404 can represent host device 102 illustrated in FIG. 1.

Accessory device 402 is typically a portable device that is powered by battery 406. Accessory device 402 can also include at least controller 408, user input device 410, output device 411, and memory 412. Controller 408 controls the overall operation of accessory device 402. User input device 410 enables a user to interact with accessory device 402. As an example, user input device 410 can include a button that enables a user to place accessory device 402 into a pairing mode (or a discovery mode). In one implementation, output device 411 can display information for the user to view. As an example, user output device 411 can be a display device (e.g., LCD display). In another implementation, output device 411 can provide information in an audio manner. In still another implementation, output device 411 can provide information in a physical manner (e.g., tactile, vibrational, etc.). Memory 412 provides persistent data storage for various elements, including program code and data. Still further, accessory device 402 can include transceiver 414 and wireless module 415. Wireless module 415 couples to or includes transceiver 414. In one embodiment, wireless module 415 can store a key that is used to pair wireless devices. In one embodiment, transceiver 414 is a radio-frequency (RF) transceiver. Transceiver 414 can output a wireless transmission over wireless transmission medium 416 (e.g., a wireless link). Typically, the wireless transmission is directed toward host device 404. As an example, wireless transmission medium 416 can be associated with a short range wireless network, such as a Bluetooth network.

Host device 404 can include transceiver 418 for wireless transmission medium 416 (e.g., wireless link). Host device 404 can also include at least controller 420, memory 422, operating system 424, application program(s) 426, output device 428, and user input device 430. Controller 420 controls the overall operation of host device 404. Memory 422 can be used to store persistent data, including program code (e.g., for operating system 424 and application program(s) 426) and data. Operating system 424 together with controller 420 enables host device 404 not only wirelessly receive transmissions from accessory device 402, but to also support and operate one or more application programs 426 as well as to utilize output device 428 and user input device 430.

Host device 404 can also include wireless module 432. Wireless module 432 can pertain to one or a set of integrated circuits that provide wireless communication functionality. Wireless module 432 is used when communicating over wireless link 416 to wireless module 415. In this regard, wireless module 432 couples to or includes transceiver 418. In one embodiment, wireless module 432 can store pin code (or key) 434 that is used to pair wireless devices.

In one embodiment, short range data link 436 can be provided between accessory device 402 and host device 404. In this regard, accessory device 402 can include external interface 438 and host device 404 can include external interface 440. External interfaces 438 and 440 can allow short range data link 436 to be established between accessory device 402 and host device 404. Short range data link 436 can be used to determine whether accessory device 402 and host device 404 are closely proximate to one another. In one embodiment, short range data link 436 can be provided by direct connection of external interface 438 and external interface 440, such as via a connector (e.g., USB connector). In another embodiment, short range data link 436 can be provided by a wireless connection established between external interface 438 and external interface 440. In still another embodiment, short range data link 436 can be provided by a cable (which contains one or more wires) connected between accessory device 402 and host device 404.

According to one embodiment of the invention, accessory device 402 can be paired with host device 404 if short range data link 436 is available. When paired, host device 404 is responsive only to accessory device 402. Hence, if there are other accessory devices in the vicinity of host device 404, host device 404 understands to ignore wireless communications from such other accessory devices. In contrast, when unpaired, host device 404 is responsive to any compatible accessory devices in the vicinity.

Additional details are discussed below for the operations associated with pairing wireless devices (e.g., accessory devices) to host devices. When paired, a user of accessory device 402 can interact with one or more application programs 426 operating on host device 404. For example, one type of application program 426 is a media player program capable of playing digital media assets stored in memory 422 or some other memory accessible by host device 404. Hence, the user of accessory device 402 can interact with user input device 410 of accessory device 402 to manipulate media playback controls, such as volume changes, next track, previous track, and play and pause operations associated with the media player program. For other types of application programs 426 available at host device 404, the particular controls or commands being provided by accessory device 402 to host device 404 can vary widely depending upon the application.

Figure 5:
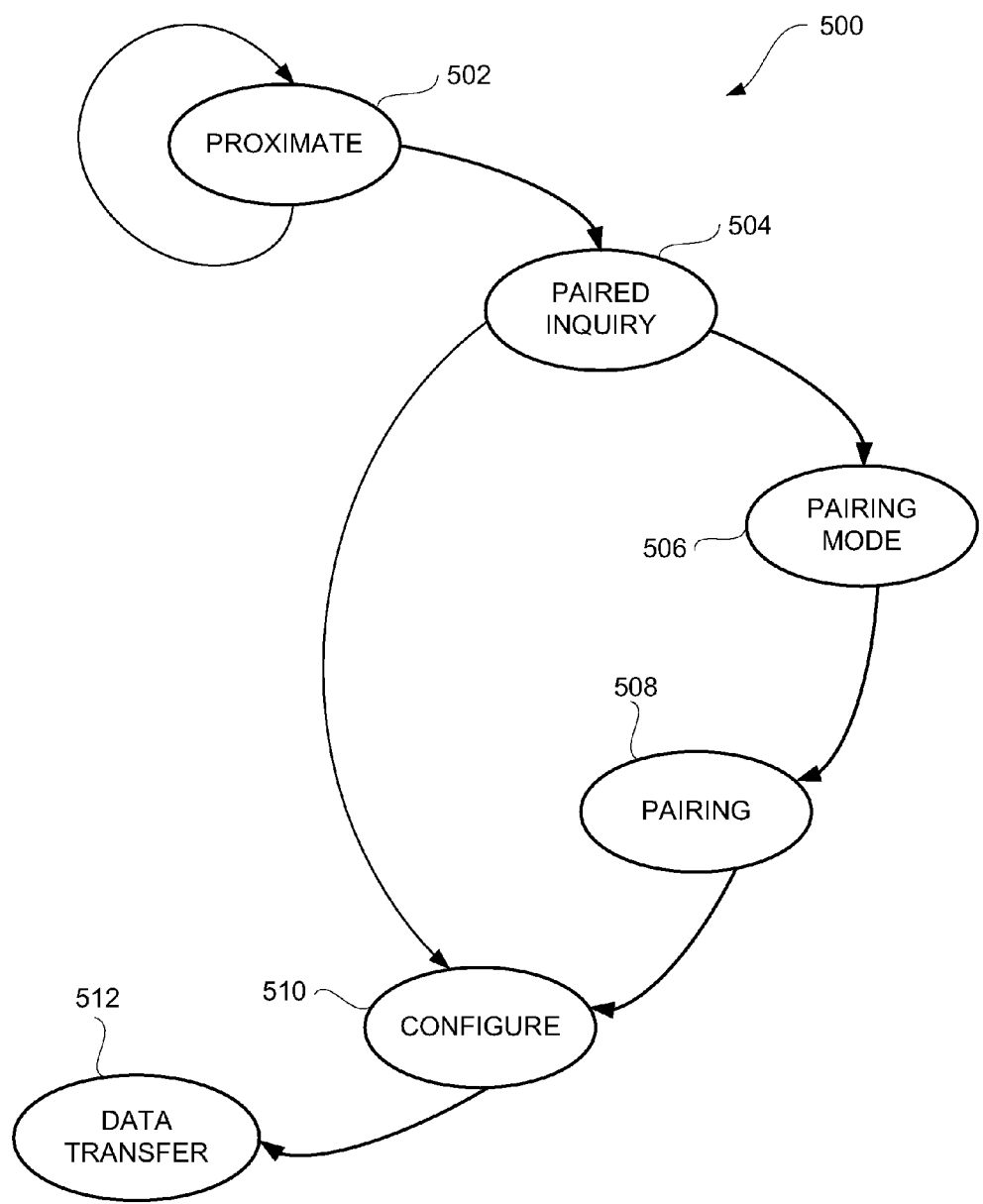
FIG. 5 is a state diagram of a pairing system according to one embodiment of the invention.

FIG. 5 is a state diagram of pairing system 500 according to one embodiment of the invention. Pairing system 500 includes proximate state 502. At proximate state 502, it is determined whether the devices to be paired are proximate to one another. Here, the requirement of proximity provides for security with respect to pairing such that unauthorized intruders are not able to pair with another device unless they can be physically proximate thereto. The proximate requirement can also be satisfied by having the devices be directly connected. At proximate state 502, if the devices are not proximate to one another, then pairing is unable to be performed and pairing system 500 can remain in proximate state 502. However, once the devices are within close proximity, pairing system 500 can transition to paired inquiry state 504. At paired inquiry state 504, pairing system 500 determines whether the devices that are in close proximity have already been paired. When pairing system 500 determines that the devices have not already been paired, pairing system 500 transitions from paired inquiry state 504 to pairing mode state 506.

At pairing mode state 506, one or both of the devices can be placed in a pairing mode as appropriate. Pairing system 500 then transitions to pairing state 508. In pairing state 508, the devices undergo a pairing process to pair the devices. For example, a pairing process typically includes the exchange of cryptographic keys or other data that are utilized to authenticate the devices to one another as well as to encrypt data being transferred between the devices. After pairing state 508 has been completed, pairing system 500 transitions to configuration state 510. Additionally, from paired inquiry state 504, pairing system 500 can also directly transition to configuration state 510 when the devices are determined to have already been paired together.

In any case, at configuration state 510, one or both of the wireless devices can be optionally configured for subsequent operation. For example, the configuration can control settings, conditions or descriptions of a wireless device. Specific examples can include preference settings, volume levels, or device/user names. After configuration state 510, the wireless devices are paired and appropriately configured and subsequent data transfer can be achieved between the devices. Hence, following configuration state 510, pairing system 500 transitions to data transfer state 512. At data transfer state 512, the wireless device that have been paired can exchange data (e.g., over a wireless data network) as desired.

Figure 6:
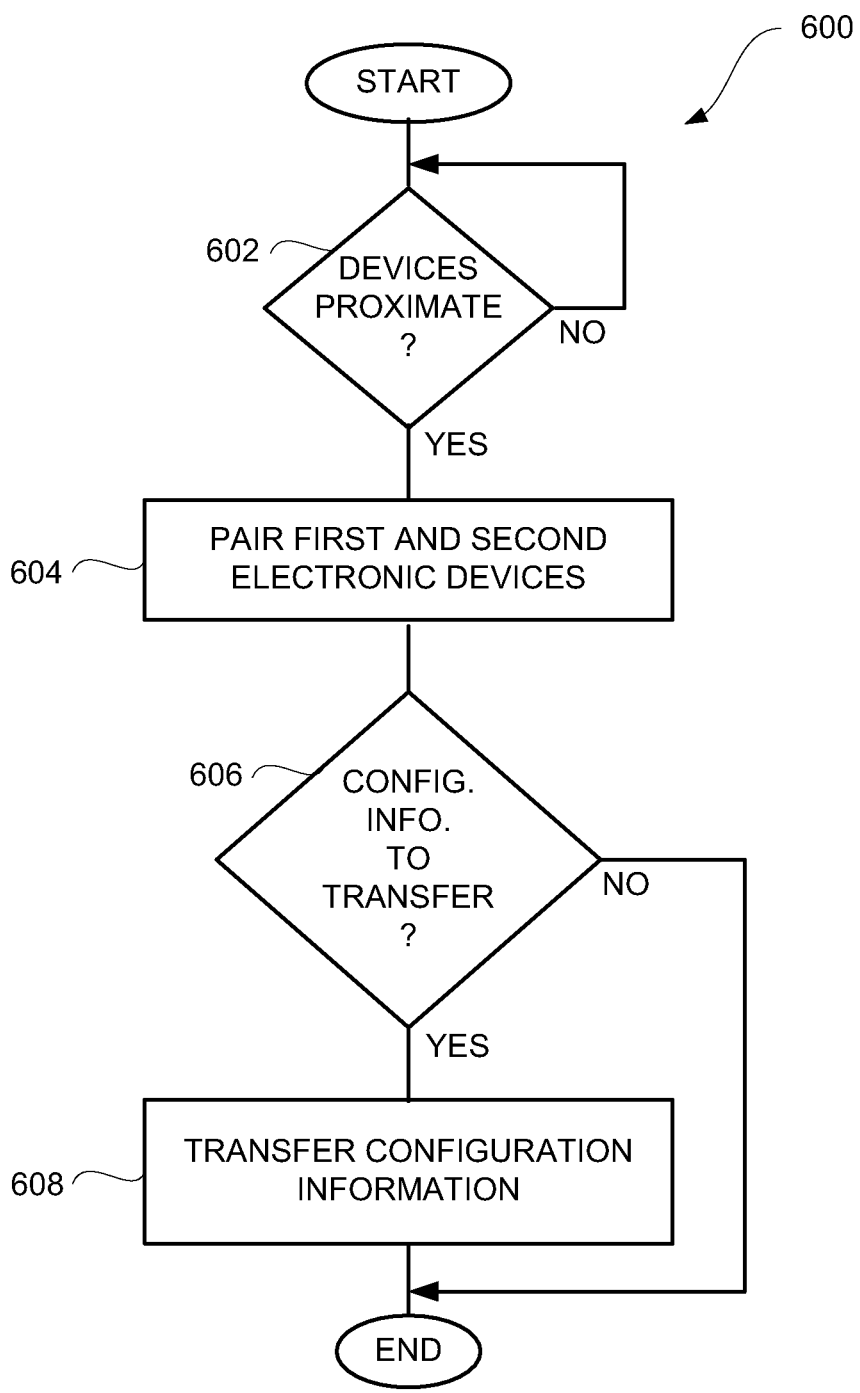
FIG. 6 is a flow diagram of a device pairing process according to one embodiment of the invention.

FIG. 6 is a flow diagram of device pairing process 600 according to one embodiment of the invention. Device pairing process 600 is, for example, performed by a host device, such as host device 102 illustrated in FIG. 1 or host device 202 illustrated in FIGS. 2A-2D.

Device pairing process 600 can begin with decision 602 that determines whether the devices, namely, first and second electronic devices, are proximate to one another. When decision 602 determines that the devices are not proximate to one another, device pairing process 600 can wait until the devices are proximate to one another. On the other hand, once decision 602 determines that the devices are proximate to one another, device pairing process 600 can continue. In other words, device pairing process 600 can be invoked when the devices are determined to be proximate to one another.

Once decision 602 determines that the devices are proximate to one another, the first and second electronic devices can be paired 604. Pairing 604 of the first and second electronic devices typically includes an exchange of cryptographic keys that are stored on the respective first and second electronic devices and subsequently utilized when transferring data between such devices. After the first and second electronic devices are paired 604, decision 606 can determine whether configuration information is to be transferred. When decision 606 determines that configuration information is to be transferred, configuration information can then be transferred 608. In one embodiment, the configuration information is retrieved from one of the first and second electronic devices and then transferred 608 to another of the first and second electronic devices. Transfer 608 of the configuration information is typically achieved over a wireless data network that has been authorized by the pairing process. Following block 608, or following decision 606 when configuration information is not to be transferred, device pairing process 600 can end. It should be noted that after the configuration information is received at a particular electronic device, the particular electronic device can be configured to operate in accordance with the configuration information.

Figure 7:
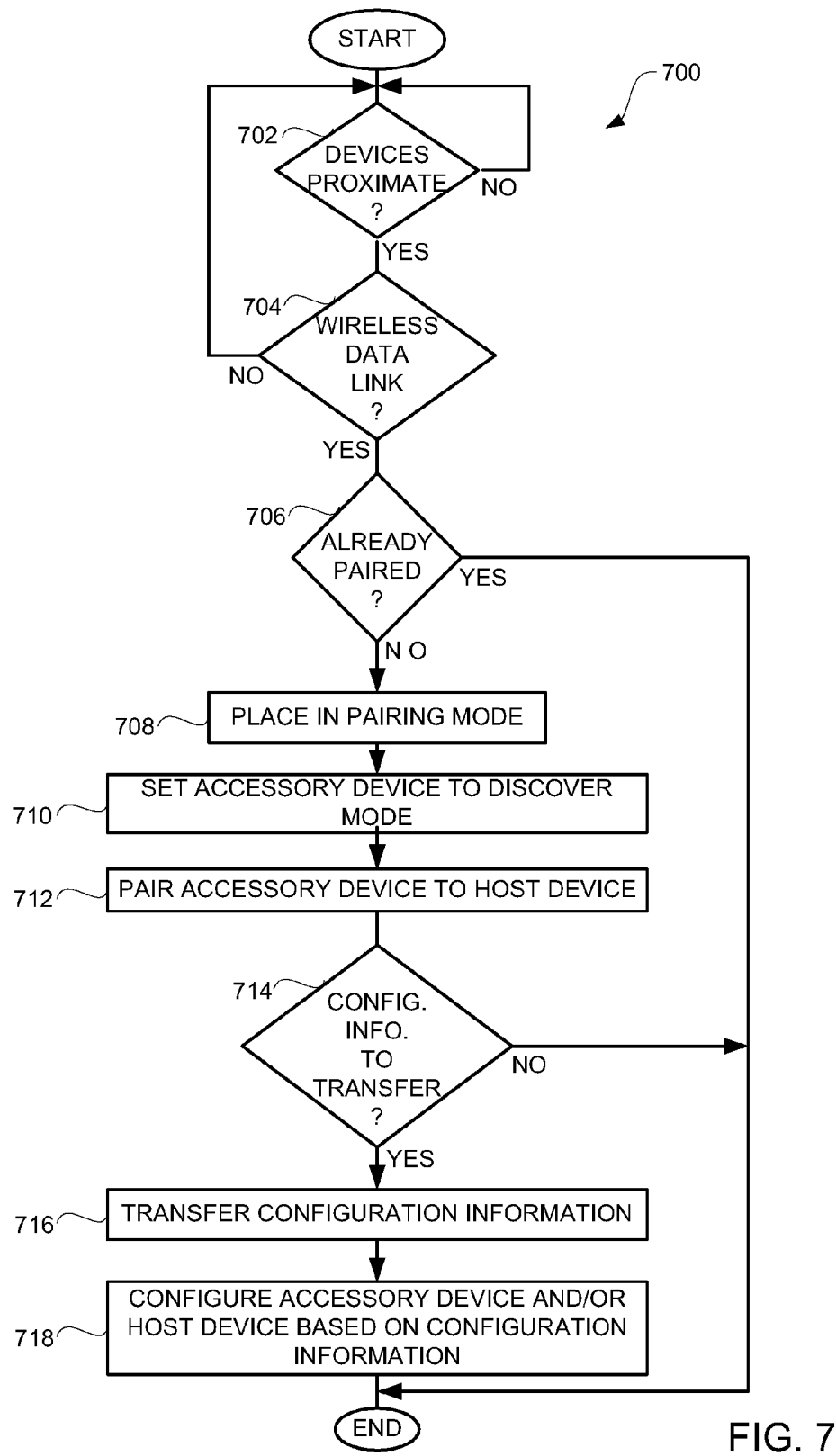
FIG. 7 is a flow diagram of a detailed device pairing process according to one embodiment of the invention.

FIG. 7 is a flow diagram of detailed device pairing process 700 according to one embodiment of the invention. Device pairing process 700 is, for example, performed by a host device, such as host device 102 illustrated in FIG. 1, host device 202 illustrated in FIGS. 2A-2D, or host device 404 illustrated in FIG. 4.

The device pairing process 700 can begin with decision 702. Decision 702 determines whether the wireless devices that are to be paired are proximate to one another. When the wireless devices, such as a host device and an accessory device that are to be paired, are not proximate to one another, then device pairing process 700 is not performed. In other words, in order for the devices to be paired, the devices must be proximate to one another.

In any case, once decision 702 determines that the devices are proximate to one another, decision 704 can determine whether a wireless data link is available between the devices to be paired. Here, the wireless data link is associated with a local wireless network that can be established between the devices. As an example, the local wireless network can be a short range wireless network, such as a Bluetooth network. Hence, decision 704 determines whether such a wireless data link is available between the devices to be paired. When decision 704 determines that the wireless data link is not available, then device pairing process 700 can return to repeat decision 702 because, in this embodiment, the device pairing cannot be performed when the wireless data link cannot be established. In such an embodiment, the pairing process, or at least a part of the pairing process, involves the exchange of data over a wireless data link.

When decision 704 determines that the wireless data link is available, decision 706 can determine whether the devices have already been paired together. When decision 706 determines that the devices have already been paired together, device pairing process 700 can end because the pairing has already been performed. On the other hand, when decision 706 determines that the devices have not been paired, additional processing can be performed to pair together the devices so that data can be subsequently transmitted between the devices over a wireless data link. In particular, the devices being paired can be referred to a host device and an accessory device (more generally, a wireless device).

The processing performed to pair together the host device and accessory device can place 708 the host device into a pairing mode. The accessory device can also be set 710 to a discover mode. Thereafter, the accessory device can be paired 712 to the host device. Pairing 712 involves at least exchanging cryptographic keys common known as key exchange between the host device and the accessory device.

Next, decision 714 can determine whether configuration information is to be transferred between the devices. Typically, if the host device stores configuration information for the accessory device, decision 714 will determine that there is configuration information to be transferred from the host device to the accessory device. Accordingly, when decision 714 determines that there is no configuration information to be transferred, device pairing process 700 can end. On the other hand, when decision 714 determines that there is configuration information to be transferred, the configuration information can be transferred 716. In one embodiment, the configuration information is transferred 716 over a wireless data link that is permitted between the devices that have been paired. For example, the configuration information can be transferred 716 over a short range wireless network, such as a piconet, one example of which is a Bluetooth network. Thereafter, the accessory device and/or host device can be configured 718 based on the configuration information. Once configured, the accessory device can operate in accordance with the configuration information. For example, if the configuration information sets a volume level, the accessory device can operate in accordance with the set volume level when operating to receive input audio signals or output audio signals. Following block 718, device pairing process 700 can end.

Figure 8:
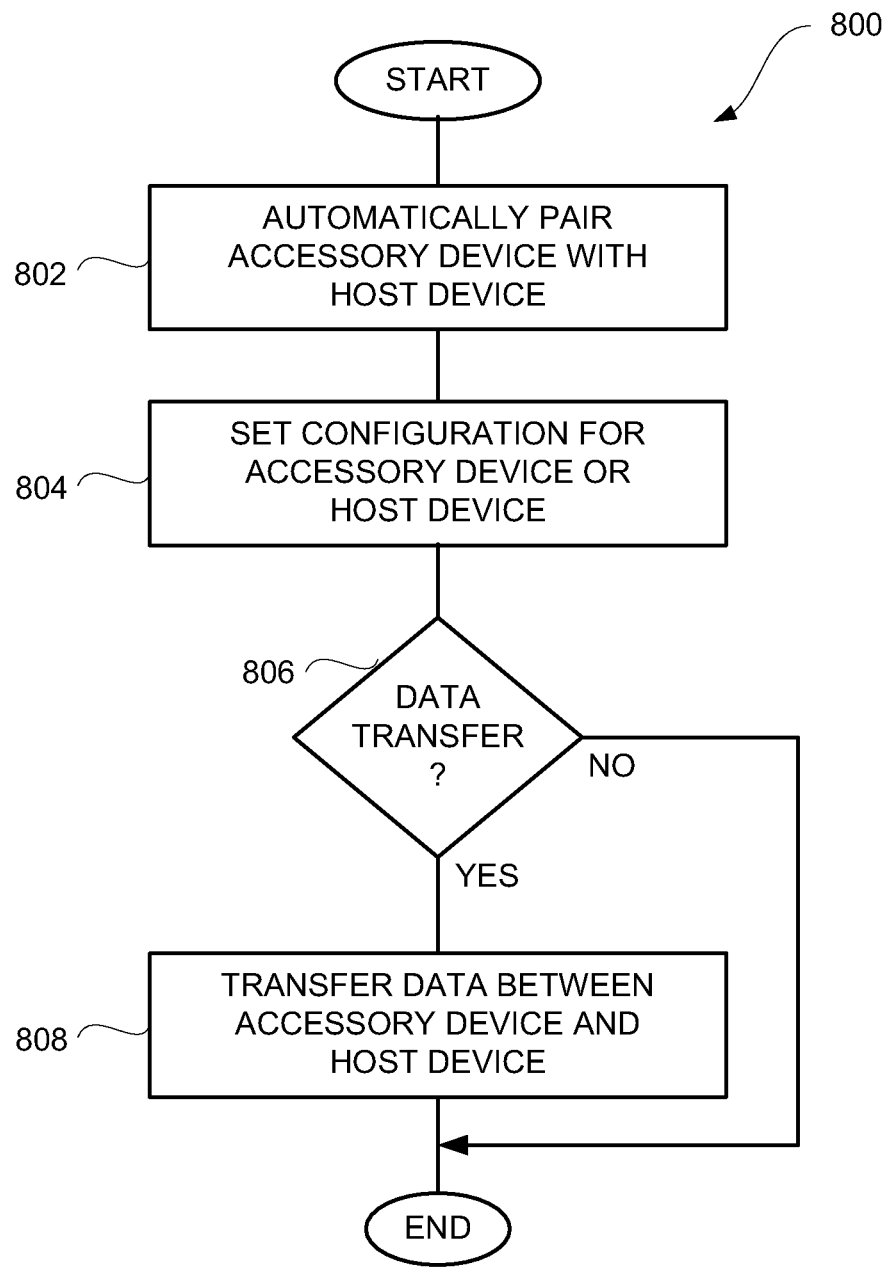
FIG. 8 is a flow diagram of an automated device pairing process according to one embodiment of the invention.

FIG. 8 is a flow diagram of automated device pairing process 800 according to one embodiment of the invention. Automated device pairing process 800 is, for example, performed by a host device. For example, the host device can be host device 102 illustrated in FIG. 1, host device 202 illustrated in FIGS. 2A-2D, or host device 404 illustrated in FIG. 4.

Automated device pairing process 800 can automatically pair 802 an accessory device with a host device. Automatic pairing 802 can, in one embodiment, involve little or no user participation to initiate or achieve a pairing of the accessory device with the host device. In one embodiment, a user can cause automated device pairing process 800 to be performed by bringing the accessory device and the host device within close proximity of one another. In another embodiment, automated device pairing process 800 can be automatically performed by physically contacting the accessory device with the host device. Optionally, user actions on either or both of the accessory device and the host device can be utilized to initiate pairing, preventing pairing or limiting pairing.

In any case, after the accessory device and the host device have been automatically paired 802, configuration information for the accessory device or the host device can be set 804. In one embodiment, the configuration information for one or both of the accessory device or the host device can be set 804. The configuration information once set 804, can influence the operation of the accessory device or the host device. For example, as noted above, the configuration information can influence operational characteristics of the accessory device, such as volume level, preference settings or device/user name.

Next, decision 806 can determine whether data transfer is to be performed. The data transfer corresponds to data to be transferred between the host device and the accessory device. Here, the data transfer corresponds to data to be transferred immediately after being paired. In general, once the accessory device has been paired with the host device, data transfer is able to be performed between the devices so long as the local wireless network is available to transfer the data between the devices. Of course, operational settings, preferences or other control means can be utilized on either the accessory device or the host device to control, influence or prevent data transfer between the devices. When decision 806 determines that data transfer is to be performed, then data can be transferred 808 between the accessory device and the host device. Here, the data transfer between the accessory device and the host device is performed following the accessory device being paired with the host device. Following block 808, automated device pairing process 800 can end. Alternatively, when decision 806 determines that data transfer is not to be performed, automated device pairing process 800 can end.

Automated pairing, such as the automated pairing provided by the automated device pairing process 800 or otherwise according to the invention, can be controlled (e.g., limited) so that automated pairing is performed in some circumstances. In some circumstances automatic pair may be undesired by manufacturer of devices, service providers or users. In one embodiment, auto pairing can be performed according to one or more auto pairing policies.

One example of an auto-pairing policy for use with a host device, an auxiliary device and an accessory device is that an accessory device is auto-paired only once. Although the accessory device can typically be paired with multiple other host devices, the accessory device is only auto-paired with one host device. As another example of an auto-pairing policy if a host device loses its pairing list (and thus authentication between the host device and an accessory device fails), auto-pairing can also be performed so that the paired devices can continue to work together. As still another example of an auto-pairing policy, if an accessory device is paired with a first host device but then placed in an auxiliary device (e.g., dock) associated with a second host device, pairing is not automatically performed. However, in such case, a user interface of the host device can permit the user of the second host device to select to pair with the accessory device via the auxiliary device.

The auto-pairing policy can, for example, be implemented in the following exemplary scenarios. In a first example, if a newly acquired host device and accessory device are both connected to an auxiliary device (e.g., dock), auto-pairing is performed. In a second example, where a first host device and a first accessory device have previously been paired, when a second host device and the first accessory device are both connected to an auxiliary device (e.g., dock), auto-pairing is not performed. Additionally, the type, model, provider or manufacturer can be used in distinguishing accessory devices or host devices, such that they are deemed non-qualifying for the auto-pairing policy. For example, a prior auto-pairing of an accessory device with a non-qualifying host device can be ignored. In a third example, where a first host device and a first accessory device have previously been paired, and where the first host device is non-qualifying, then when a second host device and the first accessory device are both connected to an auxiliary device (e.g., dock), auto-pairing is performed. In a fourth example, if a first host device was previously auto-paired with a first accessory, but the first host device has lost its link list required for authentication, when the first host device and the first accessory device are both connected to an auxiliary device (e.g., dock), auto-pairing is (again) performed.

A pairing process can include key exchange, namely, the exchange of cryptographic keys (e.g., link key), between the host device and the wireless device. The key exchange can be performed wirelessly using a local wireless network between the host device and the wireless device. Alternatively, some or all of the key exchange and some or all of the pairing operations can be performed in a wired manner.

Additionally, it should be noted that once a wireless device (e.g., an accessory device) is paired with a host device, data transfer can be performed between the wireless device and the host device. Hence, whenever either the host device or the wireless device subsequently requests data transfer therebetween, the data transfer between the devices is eligible to be performed in a wireless manner so long as the wireless device and the host device are paired and so long as a local wireless network (e.g., Bluetooth network) is available between the wireless device and the host device. In some cases, the data transfer can be controlled or restricted so as to limit the type, quantity or amount of data to be transferred. For example, once paired, devices, such as between portable media players, might exchange electronic cards, audio files (in their entirely or by streaming a song) and the like with other portable media players. Further, in some cases, the data transfer can be limited to a predetermined duration (e.g., 10 seconds, 1 minute, 10 minutes, 1 hour).

In embodiments utilizing direct connection to provide close proximity for secure pairing, it should be noted that the direct connection need only be momentary. That is, the direct connection (even if only momentary) can provide for a transfer of a key that can be used in completing the pairing process (e.g., over a local wireless network). Such a key could, in one embodiment, be used for pairing or to instead permit a short window of time during which the pairing process could complete. For example, key exchange could be performed during the momentary direct connection for pairing the devices. Thereafter, after the short window of time has expired, data transfer between the devices could still be performed in a secured manner using a local wireless network to transfer data that is encrypted through use of cryptographic keys. Such encryption could be together or apart from any encryption provided with respect to a wireless protocol being used on the local wireless network.

In still another embodiment, wireless devices in close proximity could be permitted to transfer or exchange data, often in a restricted manner, without being formally paired. For example, a pair of wireless devices being in close proximity could imply an authorization to transfer (or exchange) certain data while the wireless devices remain in close proximity. For example, one device can stream media content to another nearby device. As another example, one device can transfer (or exchange) a user profile with another nearby device. User settings or preferences can control the nature and extent of data transfer.

There are various technical approaches to determining whether devices are adequately proximate (e.g., closely proximate) to one another. For example, in one embodiment, a direct connection can be electrically sensed such as by an electrical connection. One implementation of a direct connection can be provided by an electrical connector, such as a Universal Serial Bus (USB) connector. Another implementation of a direct connection is by electrical contacts, such as conductive pads provided on a housing of a wireless device. In another embodiment, electromagnetic, magnetic, inductive or capacitive sensing can be utilized to detect close proximity. One implementation can utilize short-range radio-frequency (RF) tags to signal close proximity. In still another embodiment, optical solutions, such as infrared detection, can be utilized to detect close proximity.

Although various embodiments discussed above use a wireless accessory device as one of the wireless devices being paired, the invention is not limited to wireless accessory devices. A wireless accessory device is a wireless device that can be used in conjunction with a host device through wireless means. The invention is, however, applicable to pairing wireless devices in general. Hence, neither of a pair of wireless devices being paired is necessarily an accessory device.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that wireless devices can be paired through use of physical proximity. In some embodiments, pairing can be performed without any need for a user to enter a pin code that is often not readily available to the user. Another advantage of the invention is that pairing of wireless devices can be achieved in a substantially automated manner. The automated aspect can reduce or avoid the need for user actions to pair devices for wireless data transfer.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for pairing first and second electronic devices for wireless communication, the method comprising:
    detecting that the first electronic device and the second electronic device are connected;
    initiating pairing of the first and second electronic devices after it is detected that the first electronic device and the second electronic device are connected, wherein the initiating pairing is automatically performed by the first electronic device after it is detected that the second electronic device is in close proximity to the first electronic device;
    completing pairing of the first and second electronic devices; and
    configuring the second electronic device based on configuration information stored by the first electronic device for subsequent operations of the second electronic device.

2. A method as recited in claim 1, wherein the configuration information includes a volume setting.

3. A method as recited in claim 1, wherein the configuration information includes a preference setting.

4. A method as recited in claim 1, wherein the first electronic device is a personal computer, and the second electronic device is a portable electronic device.

5. A method as recited in claim 1, wherein the first electronic device and/or the second electronic device is a portable media player.

6. A method as recited in claim 1, wherein the first electronic device and/or the second electronic device is a portable communication device.

7. A method as recited in claim 1, wherein the first electronic device and/or the second electronic device is a portable electronic device having media playback capabilities and wireless voice communications capabilities.

8. A method as recited in claim 1, wherein the configuring of the second electronic device comprises configuring the second electronic device to control or restrict data that can be transferred by the second electronic to the first electronic device.

9. A method as recited in claim 8, wherein the controlling or restricting of data that can be transferred by the second electronic device comprises limiting or controlling one or more of the following: type of data, quantity or amount of data, and duration of transfer of data.

10. A method as recited in claim 1, wherein the method comprises:
    configuring the first electronic device subsequent to the completion of the pairing.

11. A method as recited in claim 1, wherein the method further comprises:
    subsequent to the completion of the pairing, configuring at least one of the first and electronic devices to control or restrict data transfer between them.

12. A method as recited in claim 1, wherein the method further comprises:
    causing transfer of a user profile to at least one of the first and second electronic devices to control the nature of extent of data transfer between the first and second electronic devices.

13. A method as recited in claim 1, wherein the configuring of the second electronic device comprises configuring the second electronic device for at least transfer or exchange of media data or items between them.

14. A method as recited in claim 1, wherein the configuring of the second electronic device occurs after being paired to the first electronic device.

15. A method for pairing first and second electronic devices for wireless communication, the method comprising:
    detecting whether the first electronic device and the second electronic device are connected via a docking device;
    initiating pairing of the first and second electronic devices after it is detected that the first electronic device and the second electronic device are connected;
    completing pairing of the first and second electronic devices; and
    subsequent to the completion of the pairing, configuring the second electronic device based on configuration information stored by the first electronic device for subsequent operations of the second electronic device.

16. A method as recited in claim 15, wherein the initiating pairing is automatically performed by the first electronic device after it is detected that the second electronic device is in close proximity to the first electronic device.

17. A method as recited in claim 16, wherein the second electronic device is a wireless headset.

18. A method as recited in claim 15, wherein the pairing is initiated without user action to request pairing.

19. A method for pairing first and second electronic devices for wireless communication, the method comprising:
    detecting a wired connection between the first and second electronic devices;
    initiating pairing of the first and second electronic devices after the wired connection has been detected, wherein the initiating pairing is performed after it is detected that the second electronic device is in close proximity to the first electronic device, wherein the pairing is initiated without user action to request pairing;
    completing pairing of the first and second electronic devices; and
    configuring the second electronic device based on configuration information stored by the first electronic device.

20. A method as recited in claim 19, wherein the completing pairing comprises exchanging one or more cryptographic keys over a wireless connection between the first and second electronic devices.

21. A method as recited in claim 19, wherein the wired connection is a direct connection.

22. A method as recited in claim 19, wherein the wired connection is a direct connection via electrical connector.

23. A method as recited in claim 19, wherein the wired connection is an indirect connection.

24. A method as recited in claim 19, wherein the configuring of the second electronic device comprises:

retrieving, from the first electronic device, configuration information associated with the second electronic device;

transferring the retrieved configuration information to the second electronic device; and causing configuration of the second electronic device in accordance with the retrieved configuration information.

25. A method as recited in claim 19, wherein the configuration information associated with the second electronic device includes at least one of a preference setting, a volume level or a device/user name.

26. A method as recited in claim 19, wherein the method further comprises:

thereafter transferring data between the first and second electronic devices.

27. A method as recited in claim 19, wherein the second electronic device is a wireless headset.

28. A method as recited in claim 19, wherein the first electronic device and/or the second electronic device is a portable media player.

29. A method as recited in claim 19, wherein the first electronic device and/or the second electronic device is a portable communication device.

30. A method as recited in claim 29, wherein the portable communication device is a mobile phone.

31. A method as recited in claim 19, wherein the first electronic device is a personal computer or a portable electronic device, and the second electronic device is a portable electronic device having media playback capabilities and wireless voice communications capabilities.

32. A method as recited in claim 19, wherein the first electronic device is a personal computer or a portable electronic device having media playback capabilities and/or wireless voice communications capabilities, and the second electronic device is an accessory device for use with the first electronic device.

33. A method as recited in claim 19, wherein the configuring the second electronic device occurs after being paired to the first electronic device.

34. A method for pairing first and second electronic devices for wireless communication, the method comprising:

detecting a user action with respect to at least one of the first electronic device and the second electronic device, wherein the user action comprises making direct physical contact between the first electronic device and the second electronic device;

initiating pairing of the first and second electronic devices in response to the detection of the user action, wherein a user performs the user action, and the user action does not require any data entry by the user to initiate pairing, wherein the initiating pairing is performed after it is detected that the second electronic device is in close proximity to the first electronic device;

completing pairing of the first and second electronic devices; and configuring the second electronic device after being paired to the first electronic device based on configuration information stored by the first electronic device.

35. A method as recited in claim 34, wherein the completing pairing comprises exchanging one or more cryptographic keys over a wireless connection between the first and second electronic devices.

36. A method as recited in claim 34, wherein the first electronic device is a personal computer or a portable electronic device having media playback capabilities and/or wireless voice communications capabilities, and the second electronic device is an accessory device for use with the first electronic device.

37. A computer readable medium including computer program code for pairing first and second electronic devices for wireless communication, the computer readable medium comprising:

computer program code for detecting that the second electronic device is in close proximity of the first electronic device;

computer program code for detecting that the first electronic device and the second electronic device are connected;

computer program code for pairing of the first and second electronic devices after or while it is detected that the second electronic device is in close proximity to the first electronic device, wherein the pairing is automatically performed by the first electronic device after it is detected that the second electronic device is in close proximity to the first electronic device and that the first electronic device and the second electronic device are connected; and computer program code for configuring the second electronic device after being paired to the first configuration device based on configuration information available to the first electronic device.

38. A computer readable medium as recited in claim 37, wherein the computer program code for pairing comprises:

computer program code for operating the first electronic device in a pairing mode;

computer program code for setting the second electronic device in a discovery mode; and computer program code for exchanging cryptographic keys between the first electronic device and the second electronic device.

39. A host electronic device, comprising:

a docking device for connecting a wireless device and the host electronic device, wherein the docking device is operable to detect that the wireless device and the host electronic device are connected;

a pairing manager operatively connected to the docking device, the pairing manager manages pairing of the host electronic device and the wireless device and the pairing manager automatically initiates pairing when the wireless device is connected to the host electronic device, wherein the pairing manager requires that the wireless device to be connected to the host electronic device in order to pair the host electronic device and the wireless device, and wherein, following the pairing, the pairing manager configures the wireless device that is paired to the host electronic device based on configuration information available to the host electronic device.

40. A host electronic device as recited in claim 39, wherein the host electronic device is a personal computer or a portable electronic device having media playback capabilities and/or wireless voice communications capabilities, and the wireless device is an accessory device for use with the host electronic device.

41. A method as recited in claim 40, wherein the accessory device is a wireless headset.

42. In a first electronic device, a method comprising:

detecting that a second electronic device is in proximity for wireless communication with the first electronic device;

initiating communication in a restricted or limited manner with the second electronic device to effectively link the second electronic device to the first electronic device for data transfer between them, after the second device is detected in the proximity for wireless communication with the first electronic device, wherein the initiating communication is performed after detecting that the first electronic device and the second electronic device are connected; and subsequent to completion of the effective linking of the second electronic device to the first electronic device, configuring at least one of the first and second linked electronic devices.

43. A method as recited in claim 42, wherein the linking of the second electronic device to the first electronic device does not formally pair the first and second devices together.

44. A method as recited in claim 42, wherein the linking of the second electronic device to the first electronic device pairs the first and second devices together.

* * * * *